United States Patent
Wang

(10) Patent No.: US 8,381,274 B2
(45) Date of Patent: *Feb. 19, 2013

(54) SECURITY SYSTEM AND METHOD FOR GRANTING ACCESS

(75) Inventor: Kui-Jun Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 353 days.

This patent is subject to a terminal disclaimer.

(21) Appl. No.: 12/647,405

(22) Filed: Dec. 25, 2009

(65) Prior Publication Data

US 2010/0333197 A1 Dec. 30, 2010

(30) Foreign Application Priority Data

Jun. 25, 2009 (CN) .......................... 2009 1 0303668

(51) Int. Cl.
*G06F 7/04* (2006.01)
(52) U.S. Cl. ............................................. 726/6; 726/19
(58) Field of Classification Search .................... 726/19, 726/5–7, 27; 345/173; 713/183, 171, 185, 713/186, 323; 380/251, 262, 264, 277
See application file for complete search history.

(56) References Cited

U.S. PATENT DOCUMENTS

| | | | |
|---|---|---|---|
| 5,928,364 A * | 7/1999 | Yamamoto | 726/18 |
| 7,743,241 B1 * | 6/2010 | Moore | 713/2 |
| 7,844,825 B1 * | 11/2010 | Neginsky | 713/184 |
| 2007/0074271 A1 * | 3/2007 | Camara | 726/2 |
| 2008/0072320 A1 * | 3/2008 | Hurley | 726/21 |
| 2009/0172810 A1 * | 7/2009 | Won et al. | 726/19 |
| 2010/0212001 A1 * | 8/2010 | Kashyap et al. | 726/7 |

* cited by examiner

*Primary Examiner* — Farid Homayounmehr
*Assistant Examiner* — Suman Debnath
(74) *Attorney, Agent, or Firm* — Altis Law Group, Inc.

(57) ABSTRACT

A method for granting access to change a security system from a locked state to an unlocked state includes: displaying a security access interface, wherein the security access interface comprises a graphical region, the graphical region is filled with a plurality of colors; selecting at least one color in the graphical region; at least recording at least one color property according to the at least one selected color; generating an input password at least according to the at least one recorded color property; determining whether the input password matches a predetermined password; and granting access if the input password matches with the predetermined password. A related security system is also provided.

8 Claims, 4 Drawing Sheets

SECURITY SYSTEM AND METHOD FOR GRANTING ACCESS

BACKGROUND

1. Technical Field

The present disclosure relates to security systems, and more particularly to a security system and a method for granting access used by the security system.

2. Description of Related Art

A conventional password often includes numerical numbers and/or letters, such as, 0-9, and a-z/A-Z. However, input devices used for inputting password information are substantially similar, and locations of the numbers and the letters arranged in the input device are almost uniform and common. Accordingly, passwords can easily be figured out merely by observing how they are input.

BRIEF DESCRIPTION OF THE DRAWINGS

The components of the drawings are not necessarily drawn to scale, the emphasis instead being placed upon clearly illustrating the principles of a security system and a method for granting access. Moreover, in the drawings, like reference numerals designate corresponding parts throughout several views.

DETAILED DESCRIPTION

Figure 1:
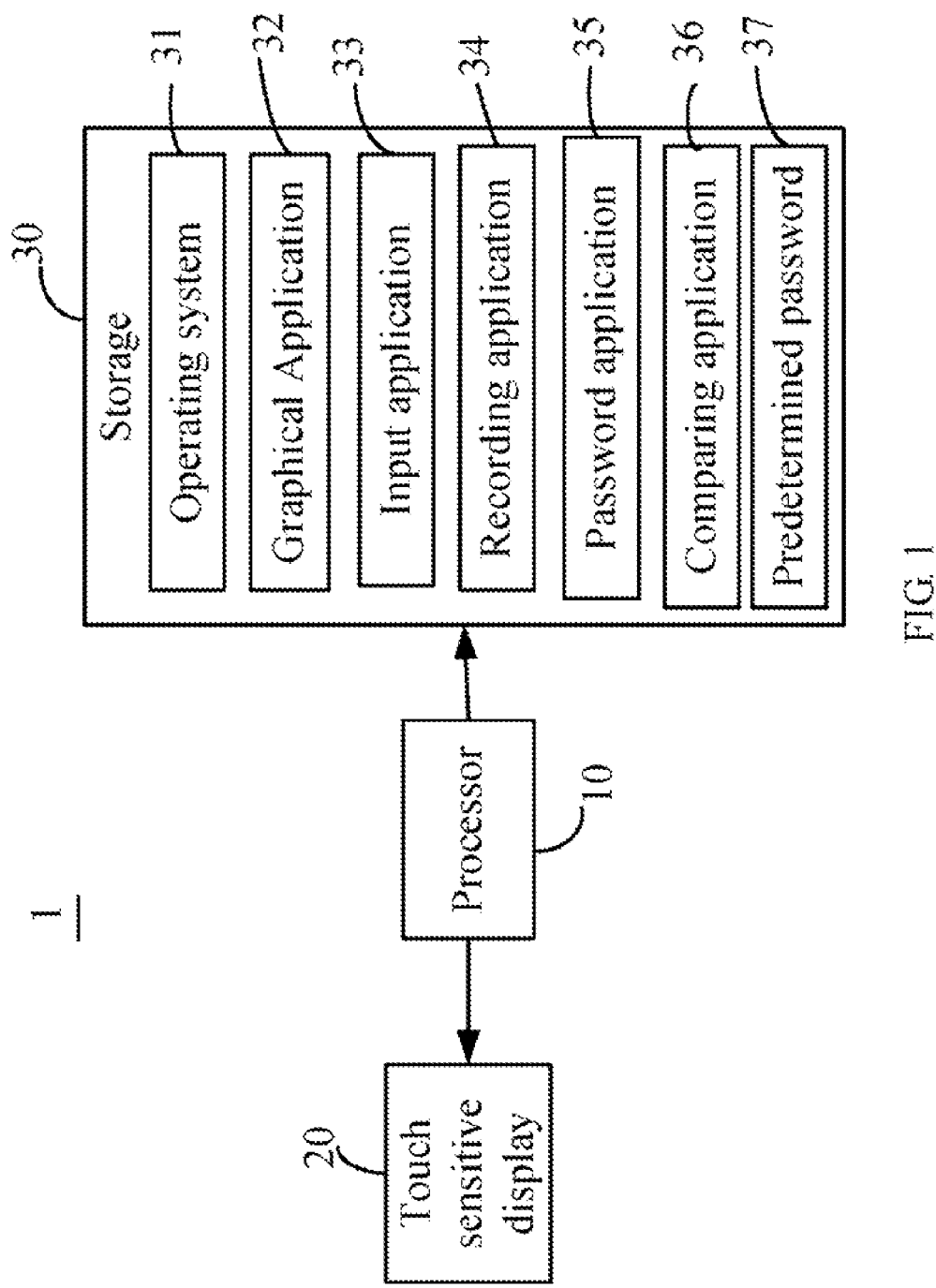
FIG. 1 is a block diagram of a security system in accordance with an exemplary embodiment.

Referring to FIG. 1, a block diagram of a security system 1 in accordance with an exemplary embodiment is shown. The system 1 generally includes a processor 10, a touch sensitive display 20, and a storage 30.

The processor 10 executes/runs various software components in the storage 30 to perform various functions for the security system 1, and controls the operations of the security system 1.

The touch sensitive display 20 provides both an output interface and an input interface between the security system 1 and a user. The touch sensitive display 20 is operable to receive inputs/contacts by one or more means, for example, a stylus and/or by touch. The touch sensitive display 20 is also operable to output graphical data. The visual outputs may include text, graphic, video, and any combination thereof.

The storage 30 stores an operating system 31, a graphical application 32, an input application 33, a recording application 34, a password application 35, a compare application 36, and a predetermined password 37 used for authenticating an inputted password.

The operating system 31 (e.g., LINUX®, UNIX®, WINDOWS®, or an embedded operating system 31 such as VxWorks®) includes various procedures, sets of instructions, software components and/or drivers for controlling and managing general system tasks (e.g., memory management, storage control, and power management, etc.) and facilitating communication between various hardware and software components.

The graphical application 32 includes various software components and/or set of instructions, which may be implemented by the processor 10 for rendering and displaying graphical user interfaces (GUI) on the touch sensitive display 20. It should be noted that the GUI can include any object that can be displayed, including, text, web pages, digital images, videos, animations and the like.

Figure 2:
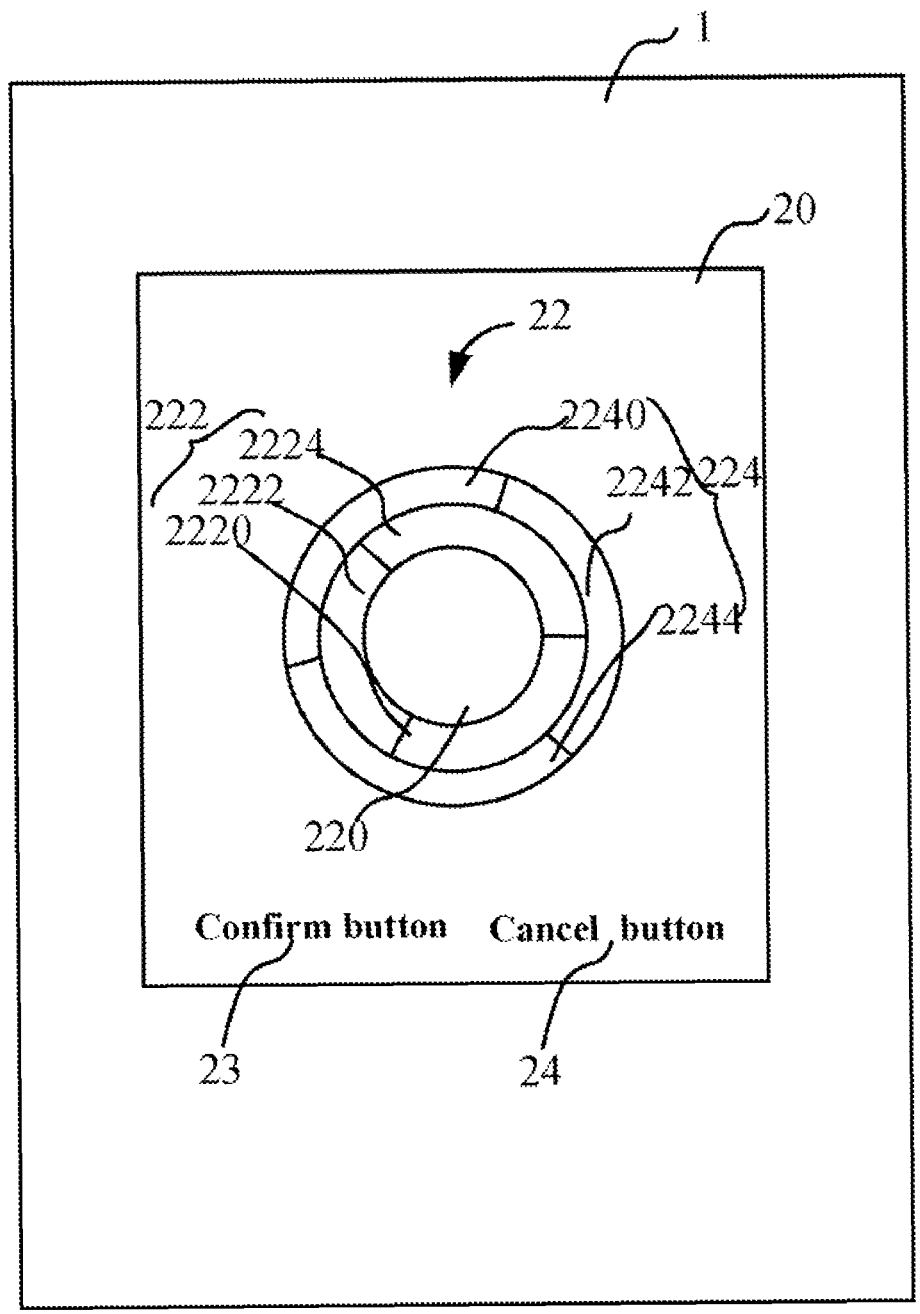
FIG. 2 is a schematic diagram showing a security access interface generated by the security system of FIG. 1.

Referring also to FIG. 2, when the system 1 is triggered to prompt for accessing/unlock operations (procedures), the graphical application 32 is implemented by the processor 10 to display a security access interface on the touch sensitive display 20. The interface provides a graphical region 22 for the user to input an input password.

The graphical region 22 is divided into three color regions 220, 222, and 224. The color region 222 is divided into three color cells 2220, 2222, and 2224, and the color region 224 is also divided into four color cells 2240, 2242, and 2244. The color region 220 is filled with one color, and each of the cells 2220, 2222, 2224, 2240, 2242, and 2244 is also filled with one color. In the embodiment, the color region 220 is a circle, and the color regions 222 and 224 are annular rings concentric with the color region 220. One or more colors selected in the graphical region 22 can be used to generate an input password. A sequence of selecting colors in the graphical region 22 can also be used to generate an input password.

Figure 3:
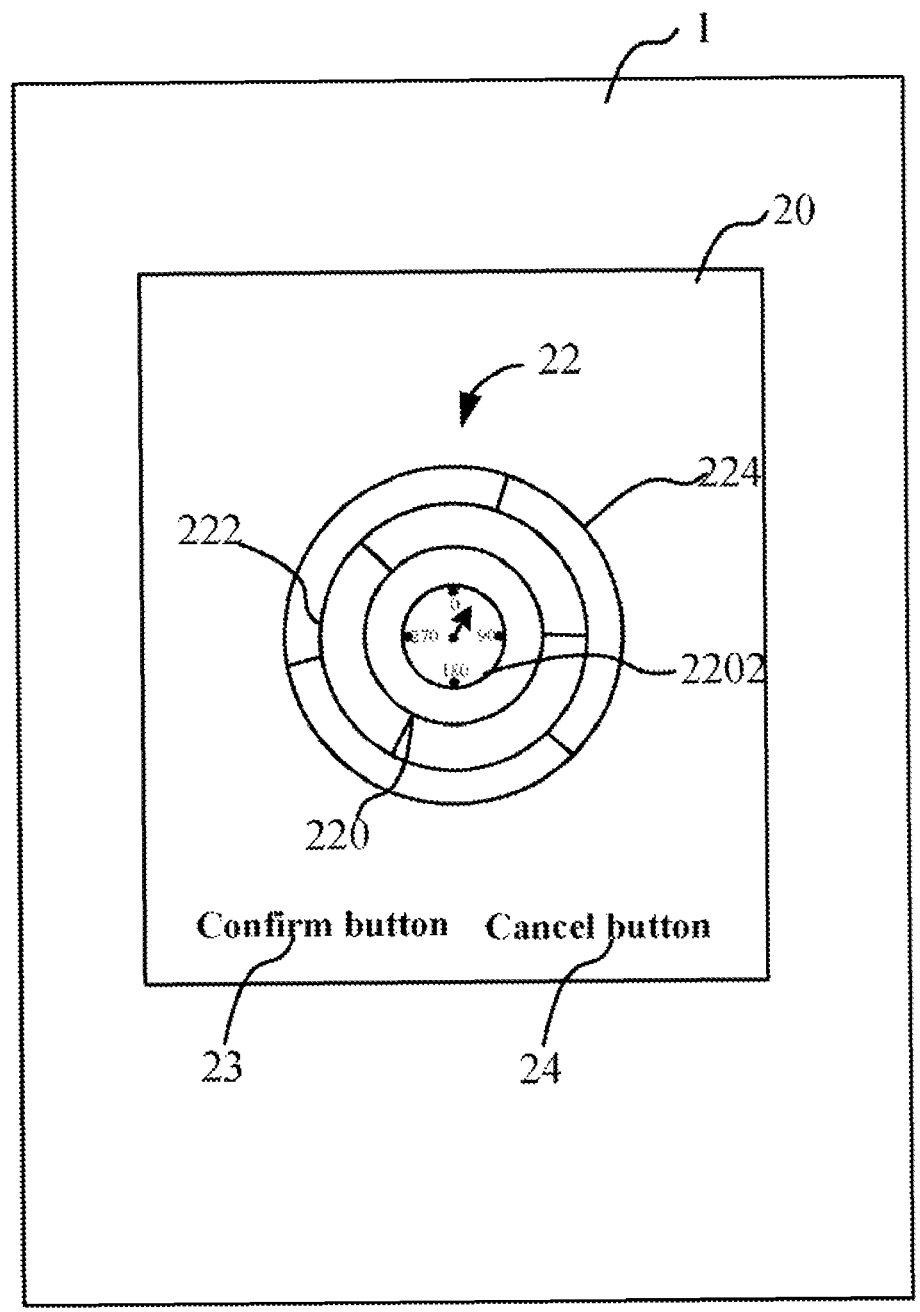
FIG. 3 is a schematic diagram showing a security interface generated by the security system of FIG. 1, slightly different from FIG. 2.

The color regions 222 and 224 can further be rotated around the color region 220. Before selecting one or more colors in the color region 222 or 224, the user can rotate the color region 222 or 224 clockwise or anticlockwise. The rotation angle and the rotation direction can be used to generate an input password. Preferably, when rotating the color region 222 or 224, an angle table 2202 (see FIG. 3) is displayed on the color region 220 to indicate the rotation angle and the rotation direction.

The security access interface further includes a virtual confirm button 23 and a virtual cancel button 24. The confirm button 23 is configured to generate a confirm instruction according to instructions from the touch sensitive display 20. The cancel button 23 is configured to generate a cancel instruction according to input instructions from the touch sensitive display 20.

The input application 33 includes various software components and/or set of instructions, which can be invoked/implemented by the processor 10 for receiving instructions from the touch sensitive display 20, and performing various functions for example selecting one or more colors according to received instructions.

The recording application 34 includes various software components and/or set of instructions, which can be invoked/implemented by the processor 10 for recording at least one color property according to at least one selected color in the graphical region 22. In an alternative embodiment, the recording application 34 can further be invoked/implemented to record a sequence of selecting at least one color in the graphical region 22, or record at least one rotation angle and at least one rotation direction according to at least one rotation of the color region 222 or 224.

The password application 35 includes various software components and/or set of instructions, which can be invoked/implemented by the processor 10 for generating an input password at least according to the at least one recorded color property. The password application 35 can also be invoked/implemented to generate an input password further according to the sequence of selecting the at least one color, the at least one recorded rotation angle, and the at least one recorded rotation direction. In the embodiment, when a confirm signal is received from the touch sensitive display 20, the password application 35 is invoked/implemented by the processor 10 to generate the input password.

Furthermore, the input password can be defined as a newly predetermined password to replace the previously predetermined password 37 stored in the storage 30.

The compare application 36 includes various software components and/or set of instructions, which can be invoked/implemented by the processor 10 for comparing the input password with the predetermined password 37. When the input password matches the predetermined password 37, the security system 1 is unlocked. Otherwise, the security system 1 remains locked.

Figure 4:
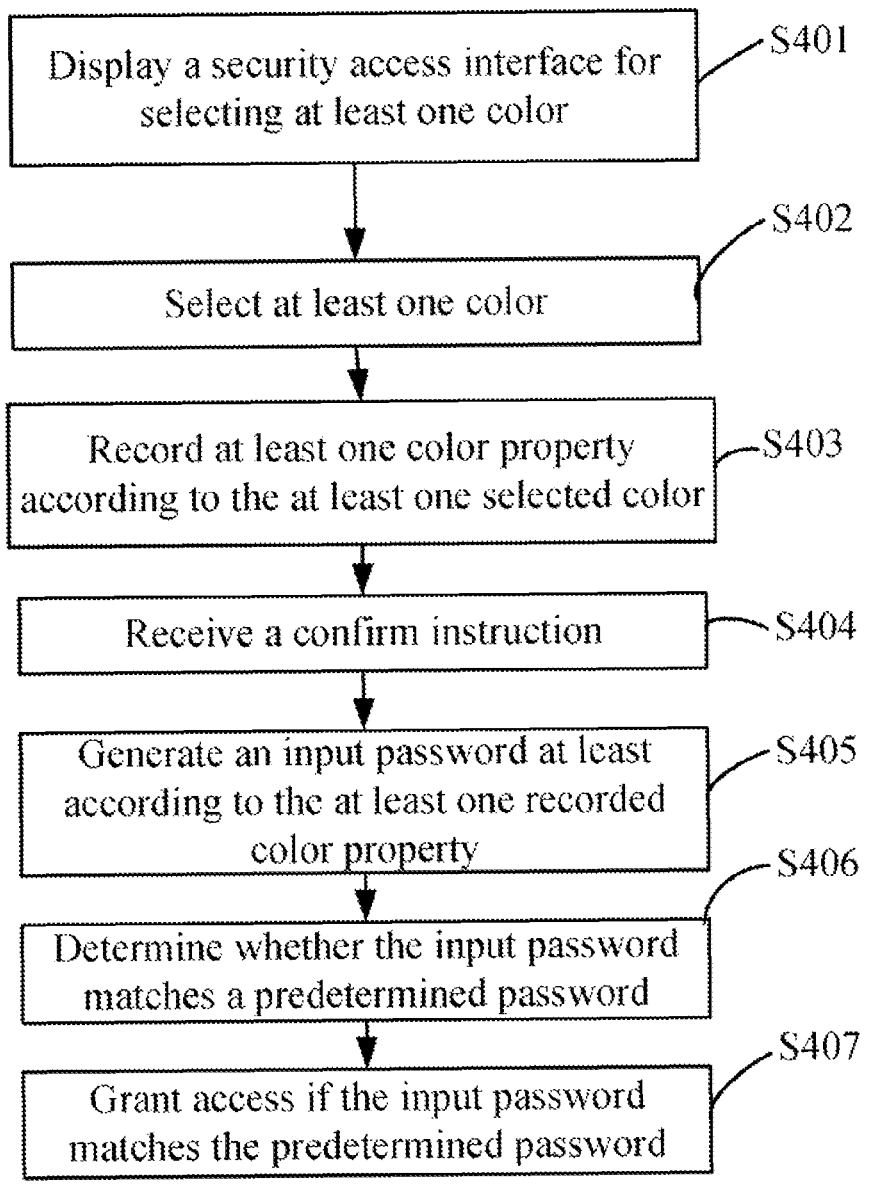
FIG. 4 is a flowchart of a method for granting access in accordance with an embodiment.

Referring to FIG. 4, a flowchart illustrating a method used by the security system 1 of FIG. 1 for granting access is shown. The method includes the following steps, each of which is tied to various modules contained in the security system 1 as shown in FIG. 1.

In step S401, in operation, the processor 10 invokes/implements the graphical application 32 to display the security access interface on the touch sensitive display 20. The interface provides the graphical region 22. The graphical region 22 is filled with a plurality of colors.

In step S402, the processor 10 invokes/implements the input application 33 to receive user instructions from the touch sensitive display 20, thereby, selecting at least one color. In an alternative embodiment, the input application 33 can be further invoked/implemented to receive user instructions from the touch sensitive display 20 to rotate the graphical region 22.

In step S403, the processor 10 invokes/implements the recording application 34 to record at least one color property according to the at least one selected color in the graphical region 22. In an alternative embodiment, the recording application 34 can further be invoked/implemented to record a sequence of selecting the at least one color in the graphical region 22, and at least one ration angel and at least one ration direction according to the at least one rotation of the graphical region 22.

In step S404, the processor 10 invokes/implements the input application 33 to determine whether a confirm instruction is received from the input unit 20.

In step S405, if the confirm instruction is received, the processor 10 invokes/implements the password application 35 to generate an input password according to the at least one recorded color property. In an alternative embodiment, the password application 35 is invoked/implemented to generate the input password further according to the recorded sequence of selecting the at least one color, the at least one rotation angle, and the at least one rotation direction.

In step S406, the processor 10 invokes/implements the compare application 36 to determine whether the input password matches the predetermined password 37 in the storage 30.

In step S407, the processor 10 triggers the security system 1 to grant access/unlock operations (procedures) if the input password matches the predetermined password 37.

As described above, the user is granted access by selecting at least one color in the graphical region 22, thereby, protecting the password more safely and efficiently as it cannot be easily determined by mere observation since fixed patterns of input options are not being displayed.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A security system comprising:
   a touch sensitive display;
   a storage storing a predetermined password and a plurality of modules; and
   a processor executing the plurality of modules;
   wherein the plurality of modules comprises instructions executable by the processor to:
   display a security access interface on the display unit, wherein the security access interface comprises a graphical region, the graphical region is filled with a plurality of colors, the graphical region is divided into a circular first color region, an annular second color region concentric with the first color region, an annular third color region concentric with the first color region, the second and third color regions being rotatable around the first color region;
   select at least one color filled in the graphical region according to instructions from the touch sensitive display;
   record a sequence of selecting at least one color in the graphical region;
   receive user instructions from the touch sensitive display to rotate the second and/or the third color region;
   record at least one rotation angle and at least one rotation direction according to rotation of the second and/or the third color region;
   generate an input password according to the sequence of selecting the at least one color, the at least one recorded rotation angle, and the at least one recorded rotation direction;
   determine whether the input password matches the predetermined password;
   and grant access if the input password matches the predetermined password.

2. The security system as described in claim 1, wherein when the graphical region is rotated, an angle table is displayed for indicating the rotation angle and the rotation direction.

3. The security system as described in claim 2, wherein the plurality of modules further comprises instructions executable by the processor to:
   determine whether a confirm instruction is received; and
   generate the input password if the confirm instruction is received.

4. The security system as described in claim 2, wherein the plurality of modules further comprises instructions executable by the processor to:
   keep the security system in a locked state if the input password does not match the predetermined password.

5. A method for granting access to change a security system from a locked state to an unlocked state, the method comprising:
   display a security access interface on the display unit, wherein the security access interface comprises a graphical region, the graphical region is filled with a plurality of colors, the graphical region is divided into a circular first color region, an annular second color region concentric with the first color region, an annular third color region concentric with the first color region, the second and third color regions being rotatable around the first color region;
   selecting at least one color filled in the graphical region;

recording a sequence of selecting at least one color in the graphical region;

receiving user instructions from the touch sensitive display to rotate the second and/or the third color region;

record at least one rotation angle and at least one rotation direction according to rotation of the second and/or the third color region;

generate an input password according to the sequence of selecting the at least one color, the at least one recorded rotation angle, and the at least one recorded rotation direction;

determine whether the input password matches the predetermined password; and grant access if the input password matches the predetermined password.

6. The security system as described in claim 5, wherein when the graphical region is rotated, an angle table is displayed for indicating the rotation angle and the rotation direction.

7. The method as described in claim 6, further comprising:
determining whether a confirm instruction is received; and
generating the input password if the confirm instruction is received.

8. The method as described in claim 6, further comprising:
keeping the security system in the locked state if the input password does not match the predetermined password.

* * * * *